Feb. 7, 1933.   C. R. PATON   1,896,968
CLUTCH
Filed Feb. 8, 1930

INVENTOR.
Clyde R. Paton
BY
ATTORNEY

Patented Feb. 7, 1933

1,896,968

UNITED STATES PATENT OFFICE

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY

CLUTCH

Application filed February 8, 1930. Serial No. 426,865.

This invention relates to vehicle clutches and particularly to means provided therein for preventing vibrations from being transmitted to the vehicle transmission.

The principal object of the invention is to provide a vehicle clutch with a resilient driving connection between the clutch plate and clutch hub which has large torsional capacity and is of relatively small diameter and length.

Another object is to provide a vehicle clutch with a resilient member positioned between and bonded to the clutch plate and clutch hub, adjustable tensioning means being also provided to regulate the torsional movement of the resilient member.

A further object is to provide a vehicle clutch with a plurality of clutch plates each having a clutch hub associated therewith and independently mounted on the transmission shaft, means being provided to permit torsional movement of the clutch plates relative to their respective hubs and to each other.

A further object is to provide a vehicle clutch with a clutch plate and a clutch hub, the plate and hub having means secured thereon to provide a labyrinth enclosure receiving a resilient member whereby the plate is permitted to have torsional movement relative to the clutch hub.

A still further object is to provide a vehicle clutch with clutch plates positioned on opposite sides of a pressure plate and adapted to have torsional movement relative to each other, means being provided between the clutch plates to permit the proper contact of the clutch plates with the pressure plate.

The above being among the objects of the present invention, further objects relating to details of construction and manufacture will be apparent from the detailed description to follow, and then claimed, having the above and other objects in view.

In the accompanying drawing which illustrates a suitable embodiment of the present invention and in which like numerals refer to like parts throughout the several views, Figure 1 is a longitudinal sectional view of the vehicle clutch embodying my invention, certain parts being shown in full lines and parts of the engine and transmission in dotted lines to more fully illustrate the invention.

Figure 4 is an enlarged sectional view taken on the line 4—4 of Figure 2.

Figure 3:
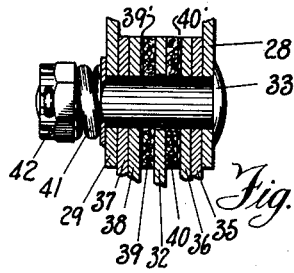
Figure 3 is a sectional view taken on the line 3—3 of Figure 1, showing the disk splined to the transmission drive shaft.
Figure 3:
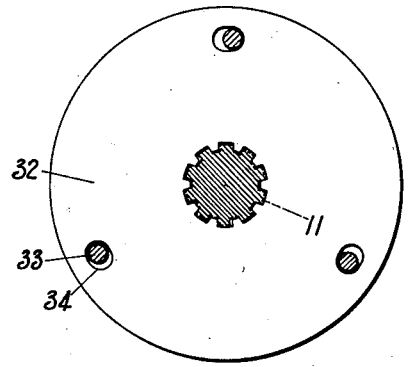
Figure 2:
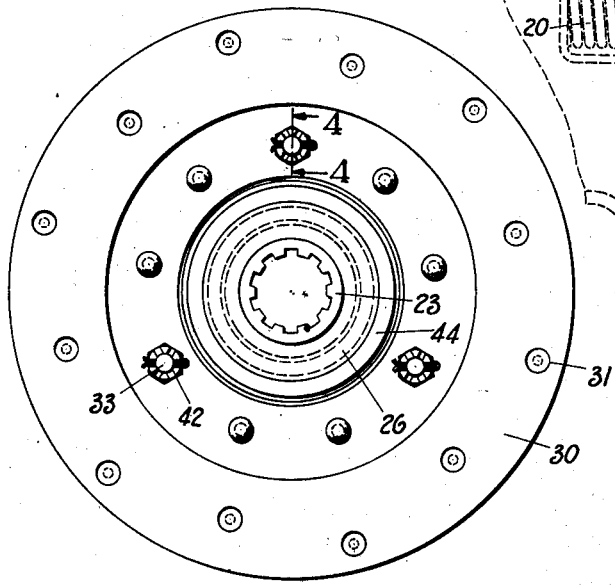
Figure 2 is a sectional view taken substantially on the line 2—2 of Figure 1.

In the type of clutch illustrated in the drawing, driving torque is transmitted from the engine crankshaft 10 to the vehicle transmission drive shaft 11 by means of the clutch comprising the pressure plates 12 and 13, a cover plate 14, releasing pins 15 mounted in the pressure plate 13 extending through openings 16 in the cover plate 14, relieving levers 17 carried by the releasing pins 15 engaging with the shifting collar 18 maintained in operative engagement therewith by means of the springs 19 positioned between the cover plate 14 and the levers 17, and coil springs 20 interposed between the cover plate 14 and the pressure plate 13 tending to force the pressure plate 13 toward the pressure plate 12 and the flywheel 21 of the engine. The clutch construction heretofore described is for the purpose of illustration only and in detail forms no part of my invention except in so far as it is adaptable for use with my invention and reference may be had to my copending application Serial No 394,013 filed September 20, 1929 for further details regarding this construction, it being noted, however, that my copending application shows a single plate clutch.

The clutch hub comprises independent sleeves 22 and 23 splined on to the end of the transmission shaft 11. The hub portion 22 has a flange 24 arc-welded or otherwise suitably secured adjacent to the outer edge thereof, the flange 24 having an inturned portion 25 for a purpose to be hereinafter described. Likewise the hub portion 23 has a flange 26 secured adjacent to the outer edge thereof which is provided with an inturned portion 27 similar to the inturned portion 25 of the member 24. In the type of clutch illustrated, driving torque is transmitted from the engine crankshaft 10 by means of the clutch plates 28 and 29, the clutch plate 28 being positioned between the engine flywheel 21 and the pressure plate 12, and the clutch plate 29 being positioned between the pressure plates 12 and 13, the pressure plates and clutch plates being brought together by the pressure exerted by the springs 20 to drive the clutch plates 28 and 29 by their frictional engagement with the clutch plate facings 30 secured on opposite sides of the plates 28 and 29 by a plurality of rivets 31.

Figure 1:
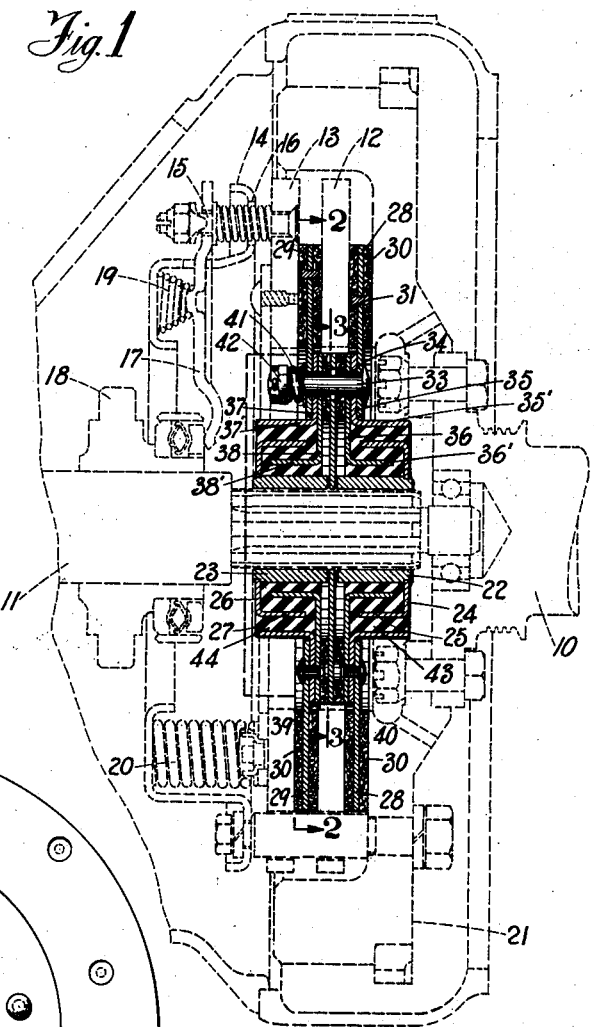

Interposed between the clutch plates 28 and 29 is a disk 32 splined on the transmission shaft 11 and positioned between the adjacent edges of the clutch hub members 22 and 23. The clutch plates 28 and 29 have aligned openings therein through which are inserted bolts 33 extending through slotted openings 34 in the disk 32, the openings 34 being somewhat larger than the bolts 33. Disks 35 and 36 L-shaped in cross section, having outwardly extending flanges 35' and portions 36', as is clearly shown in Figure 1, are welded or otherwise firmly affixed to the clutch plate 28 and similar members 37 and 38 having outwardly extending flange portions 37' and 38' are affixed to the clutch plate 29 so that the flanges 37' and 38' extend in opposite directions to corresponding flanges 35' and 36'. The disks and flanges secured to the hub member form, with the disks and flanges secured to the clutch plate, a labyrinth enclosure adapted to be filled with a resilient material to resiliently connect the hub and clutch plate together. Friction disks 39 and 40 having resilient facings 39' and 40' such as rubber sheets are positioned on opposite sides of the disk 32 to contact therewith, the facings 39' and 40' pressing against the members 38 and 36 respectively, as is shown in Figure 4.

A tension spring 41 is mounted on the bolt 33, the tension of the same being regulated by the nut 42 whereby a predetermined amount of friction is maintained between the clutch plates 28 and 29 relative to the disk 32. Resilient material 43 which may be a rubber composition surrounds the hub portion 22, the same being bonded thereto and encasing the flange 36' of the member 36, the inwardly extending portion 25 of the member 24, and engaging and bonded with the inner face of the flange 35' of the member 35, as is clearly shown in Figure 1. Likewise resilient material 44 is bonded to the clutch hub member 23 and with the flange portions of the respective members heretofore described.

In manufacturing the clutch parts the clutch plate 28 has the members 35 and 36 riveted or welded thereto and the clutch hub 22 has the member 24 welded thereto after which these respective assemblies may be placed in a suitable mould and the resilient material such as rubber 43 vulcanized to the respective parts to form the driving connection as shown in Figure 1. Likewise the clutch plate 29 has the members 37 and 38 welded thereto and the clutch sleeve 23 has the member 26 welded thereto after which these members may be put in a mould and the resilient material such as the rubber 44 vulcanized to the respective parts.

The operation of the clutch will be apparent from the foregoing description and it will be seen that vibrations caused by sudden accelerations and decelerations of the engine or driving members are eliminated by the relative movements between the clutch plates 28 and 29 and the clutch hub members 22 and 23, the enlarged openings through which the bolts 33 are inserted allowing this movement. The clutch plate members 28 and 29 are permitted to have torsional movement relative to the hub members 22 and 23 because of the elasticity of the elastic materials 43 and 44, the amount of movement being limited by the size of the openings 34 in the disk 32. It will also be understood that the clutch plates 28 and 29 may have torsional movement relative to each other as the movement of one is not wholly dependent upon the other.

It will also be seen that the frictional resistance between the clutch plates 28 and 29 is due to the friction disks 39 and 40 interposed therebetween, the amount of friction being regulated by the tension springs 41 on the bolts 33 so that the increase or decrease of friction between the clutch plate and hub members may be regulated.

It may be found desirable to permit small torsional movement in the resilient material 43 and 44 before the frictional action of the disks 39 and 40 becomes effective to frictionally resist the movement of these resilient members. If the splined connection between the disk 32 and the transmission shaft 11 is such as to permit torsional clearance between the splines on the shaft 11 and disk 32, the clutch plates 28 and 29 will be permitted to have limited torsional movement before friction is developed by the disks 39 and 40 with the result that small torsional movement of the clutch plates 28 and 29 is obtained due to the elasticity of the resilient materials 43 and 44. If, however, torsional clearance is not provided between the splines on the shaft 11 and the disk 32, the resilient material 39' and 40' forming facings for the disks 39 and 40 will permit of sufficient torsional movement of the disk 32 relative to the clutch plates 28 and 29 to permit of limited torsional movement of the latter before frictional resistance between the clutch plates 28 and 29 is developed by the tension springs 41. It will also be apparent that in a driving connection having a plurality of driving members and independent driven members in which there is the relative movement between the respective members that my friction means may be employed and it is understood that I do not wish to be limited to the use of this device in clutches but instead the same may be used in any driving mechanism having a relative movement between the driving and driven members.

The present invention operates both when the drive is from the engine to the rear axle and when it is from the rear axle to the engine. It is evident under normal driving conditions that the clutch plates prevent engine vibrations and sudden torque impulses from being transmitted to the transmission with the result that the life of the transmission is prolonged and that smoother operation of the same is obtained. The clutch mechanism is simple in its construction, easy to assemble and economical to manufacture.

Although a preferred embodiment of the invention is shown in the drawing it is to be understood that formal changes may be made in the specific embodiment of the invention described without departing from the spirit and substance of the broad invention, the scope of which is commensurate with the appended claims.

What I claim is:

1. In a clutch, the combination of, a plurality of clutch plates, a plurality of clutch hubs, resilient members positioned between said plates and hubs permitting torsional movement therebetween and of said plates relative to each other, and means limiting the torsional movement of said plates relative to their respective hubs and to each other.

2. In a clutch, the combination of, a plurality of clutch plates, a plurality of clutch hubs, a shaft on which said hubs are independently mounted, resilient means between said plates and hubs permitting torsional movement therebetween and of said plates relative to each other, and means mounted on said shaft limiting the torsional movement of said plates relative to their respective hubs.

3. In a clutch, the combination of, a plurality of clutch plates, a plurality of clutch hubs, a shaft on which said hubs are non-rotatably mounted in spaced relation to each other, resilient members between said plates and hubs permitting torsional movement therebetween and of said plates relative to each other, a slotted disk mounted on said shaft between the adjacent ends of said hubs, and means extending through said plates and the slots in said disk to limit the torsional movement of said plates relative to their respective hubs.

4. In a clutch, the comibnation of, a plurality of clutch plates, a plurality of clutch hubs, a shaft on which said hubs are non-rotatably mounted in spaced relation to each other, resilient members between said plates and hubs permitting movement therebetween and of said plates relative to each other, a slotted disk mounted on said shaft between the adjacent ends of said hubs, friction members positioned between said plates and disk, and means extending through said plates, friction disks and the slots in said first named disk to limit the torsional movement of said plates relative to their respective hubs, said friction disks permitting small torsional movement of said plates relative to their respective hubs before resisting such torsional movement.

5. In a clutch, the combination of, an outer plate, a hub, a shaft non-rotatably supporting said hub, a resilient member between said plate and said hub bonded thereto permitting torsional movement therebetween, a slotted disk non-rotatably supported on said shaft adjacent to said plate, and means extending through said plate and the slot in said disk for limiting the relative torsional movement between said plate and said hub.

6. In a clutch, the combination of, a clutch plate, a plurality of members secured thereto having portions thereof arranged concentrically, a hub, a member secured thereto having a portion arranged concentrically with the portions of said first named members to provide a labyrinth enclosure, a resilient member within said enclosure permitting torsional movement between said plate and said hub, and friction means opposing the relative torsional movement between said plate and hub.

7. In a clutch, the combination of, a plurality of outer members, a plurality of inner members, resilient material positioned between said outer and inner members to permit relative torsional movement therebetween and of said outer members relative to each other, friction means opposing the relative torsional movement between said outer and inner members, and means between said first named means and said outer members to permit limited torsional movement between said outer and inner members prior to said friction means becoming effective.

8. In a clutch having a pressure plate, the combination of clutch members positioned on opposite sides of said plate, independent clutch hubs, resilient means between each of said plates and their respective hubs permitting torsional movement therebetween and of said plates relative to each other, and means between said clutch members frictionally opposing the relative torsional movement between said members and their respective hubs.

Signed by me at South Bend, Indiana, this 5th day of February, 1930.

CLYDE R. PATON.